United States Patent [19]
Cohn

[11] Patent Number: 4,859,012
[45] Date of Patent: Aug. 22, 1989

[54] OPTICAL INTERCONNECTION NETWORKS

[75] Inventor: Robert W. Cohn, Richardson, Tex.

[73] Assignee: Texas Instruments Incorporated, Dallas, Tex.

[21] Appl. No.: 85,993

[22] Filed: Aug. 14, 1987

[51] Int. Cl.⁴ .................... G02B 6/04; G02B 6/28
[52] U.S. Cl. ................... 350/96.24; 350/96.16; 350/96.18; 350/486; 350/607; 350/611
[58] Field of Search ............. 350/96.15, 96.16, 96.18, 350/96.19, 607, 608, 611, 360, 356, 486, 487

[56] References Cited
U.S. PATENT DOCUMENTS

| | | | |
|---|---|---|---|
| 4,564,261 | 1/1986 | Kojima et al. | 350/96.24 |
| 4,615,595 | 10/1986 | Hornbeck | 353/122 |
| 4,690,500 | 9/1987 | Hayami et al. | 350/96.25 |
| 4,710,732 | 12/1987 | Hornbeck | 332/7.51 |
| 4,739,520 | 4/1988 | Collins, Jr. et al. | 455/600 |
| 4,743,090 | 5/1988 | Reidinger | 350/96.27 |

Primary Examiner—William L. Sikes
Assistant Examiner—Frank González
Attorney, Agent, or Firm—Carlton H. Hoel; Leo N. Heiting; Melvin Sharp

[57] ABSTRACT

Multichannel interconnection networks with optical deformable mirror devices as the reconfigurable switching element.

9 Claims, 12 Drawing Sheets

OPTICAL INTERCONNECTION NETWORKS

STATEMENT AS TO RIGHTS TO INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of Contract No.N00014-85-C-0755 awarded by the U.S. Navy.

CROSS-REFERENCE TO RELATED APPLICATIONS

U.S. application Nos. 777,660, filed Sept. 18, 1985 (abandoned), 901,868, filed Aug. 29, 1986 (still pending), and 018,795, filed Feb. 20, 1987 and issued Mar. 1, 1988 as U.S. Pat. No. 4,728,185, disclose related subject matter. These cross-referenced applications are assigned to the assignee of the present application.

BACKGROUND OF THE INVENTION

1. Field of the Invention

The present invention relates to interconnection networks, and, more particularly, to multichannel switches using spatial light modulators for reconfigurable switching of multiple inputs to multiple outputs.

2. Description of the Related Art

Reconfigurable interconnection of several high data rate transmitters to several receivers is a cumbersome and technically difficult task. Electromagnetic interference has been difficult to control in most electronic configurations, and most electronic implementations require a dense interconnection scheme that is either difficult or time consuming to fabricate. Reconfigurable interconnection networks underlie a variety of devices such as high computation rate parallel computing achitectures where numerous processors route information to each other or share common resources, communications switching as in telephone switching centers, and aircraft fiber optic busses that require reconfigurability to allow redundancy for fault tolerance and the ability to share several sensors with several processors.

Major trends shaping real time computation include parallel processing and symbolic processing. Many real time applications require rapid logical decisions using stored knowledge and the processing of large quantities of data at high speed. Moreover, close coupling between the symbolic and numeric computations is often desirable in fields such as speech and image understanding and recognition, robotics, weapon systems, and industrial plant control. Indeed, the widespread use of smaller computers in offices and homes and the emerging disciplines of artificial intelligence and robotics have drawn attention to the fact that an increasing amount of computing effort is spent in non-numeric or symbolic computing; many software tools used with computers, such as editors, compilers, and debuggers, make extensive use of symbolic processing. Symbolic computing leads to new methods of solving problems over and above numerical and statistical approaches because qualitative information or a priori knowledge may be made available in the form of data bases and procedures.

Attempts to solve real world problems requiring human-like intelligence, for example in robotics, speech, and vision, demand enormous amounts of symbolic and numeric computing power because of the vast amount of a priori information required for what are considered to be simple operations and the high data rates from sensors. Indeed, the signal processing of sensor data arises in fields such as acoustics, sonar, seismology, speech communication, biomedical engineering, etc. and the typical purposes of such processing include estimation of characteristic parameters, removal of noise, and transformation into a form which is more desirable. In the past, most signal processors have been tailored for speed and efficiency for a few specific algorithms. Future signal processors will need increased speed and algorithm flexibility, so that algorithms such as high resolution eigensystem beamforming and optimal Wiener filtering may be computed with the same processor and so that new algorithms may be efficiently implemented as they are developed. The ability to handle a wide range of algorithms in military systems permits different algorithms to be used during a mission and field equipment to be upgraded with new algorithms. Conventional vector approaches cannot satisfy the increasing demand for computer performance and it is necessary that future designs be capable of efficiently utilizing extensive parallelism, see L. S. Haynes, R. L. Lau, D. P. Siewiorek, and D. W. Mizell, Computer 15(1), 9(1982) and J. Allen IEEE Proc., 73(5), 852 (1985). These references, along with all others herein, are hereby incorporated by reference.

Very large scale integration in semiconductor devices is also leading towards the greater use of parallelism. Parallelism requires some sort of interconnection between the processing elements and this introduces a trade off between speed and the ability to handle a wide range of algorithms. For example, a complex interconnection network provides some flexibility at the expense of speed, and high speed may be achieved by means of fixed interconnections for a specific algorithm. The problem is to achieve very high speed by efficiently using a large number of processing elements and at the same time retain extremely high algorithm flexibility. Efficiency for parallel processing is 'the the gain in speed versus that using a single processor of the same type' divided by 'the number of processors'. Also, the complexity of the processing elements relates to the degree of parallelism obtainable; sophisticated computations tend to have parts that are not parallelizable at a coarse level. The overall speed is dominated by the parts which are non-parallelizable at a coarse level. And a large number of fast elementary processors places a considerable communication burden on the interconnection between processors. There is a need for parallel processor interconnections that possess simple reconfigurability.

Currently, most experimental systems have demonstrated the difficulty of achieving parallelism for a range of algorithms with even modest numbers of processors. The number of parallel processors (hence speed) which may be used efficiently is limited in today's prototype and proposed systems by the communication delay and interconnection complexity. The constraints imposed by the interconnections on algorithm design are a serious problem because they reduce opportunities to achieve performance by new algorithm design and raise cost by limiting the range of applications and the lifetime of the equipment.

Fixed interconnections limit the range of algorithms which may be efficiently implemented. Systolic configurations, such as those in development at Carnegie-Mellon University (Kung H. T., Why Systolic Architectures?, IEEE Computer, Jan., 1982 p37–46), use algorithm structure to reduce memory and instruction fetches. This reduces communication time and permits large numbers of processors to be efficiently used in parallel. However, the algorithm constraints are significant because of the fixed interconnections.

Algorithm flexibility may be achieved by complex reconfigurable interconnection networks, and a prototype system having 8 processors and using a Banyan switch is in operation at the University of Texas at Austin (Browne J. C., Parallel Architectures for Computer Systems, Physics Today, Vol. 37, No 5, May 1984). A Banyan is a multichannel switch composed of levels of 2×2 switches. However, this type of reconfigurability introduces large delays and high control overhead in most proposed systems and this restricts the number of processors and the speed of the system.

The distribution of effort amongst a number of processors does not remove the need for some minimum level of central control, although, for fault tolerance purposes this may not always be the same physical part of the system. The idea of a single program which alone determines the complete operation of the computer is replaced by numerous such programs running concurrently in different processors. The communication channel to the central control must be sufficient to prevent it from becoming a bottleneck. And common memory is frequently used in the process of communicating information from one processor to another. A potential difficulty, memory contention, arises when two or more processors request the same piece of information form a common memory at the same time. Some arbitration is now required and one processor will have to remain idle or make the memory request again later. This increases complexity, cost and inefficiency. A simple example arises in matrix-matrix multiplication where a single row of a first matrix is required in all processors for simultaneous multiplication with each column of a second matrix. Memory contention for such well-defined operations should be taken care of in the computer design.

Great skill is required to partition problems so that various processors complete their tasks at the appropriate time to provide information for the next stage. Synchronization forces everything to wait for the slowest link with resulting inefficiency. A parallel algorithm may involve more steps than a commonly used serial algorithm even though it is more efficient on a specific parallel machine. The overhead reduces the efficiency of the algorithm where efficiency is measured as the speed on the multi-processor divided by the speed with the fastest algorithm on a single processor. The stability and accuracy of the parallel algorithm relative to the serial algorithm must also be considered in comparison.

The communications industry makes widespread use of optical fibers and is developing optical switching devices to avoid conversion to electronics and back for switching purposes. Optics has been suggested for communication with VLSI to overcome the bandwidth pin limitations and edge connection constraints; see Goodman J. W., Leonberger F. J., Kung S. Y. and Athale R. A., Optical Interconnections for VLSI Systems, Proc. IEEE, Vol. 72, No. 7, July 1984, p850–866.

Digital optical computers are expected to eventually become dominant and a design has been proposed for solving a major class of problems, finite elements (see McAulay, Deformable Mirror Nearest Neighbor Optical Computer, to appear in Optical Engineering (1985) and abandoned U.S. appl. Ser. No. 777,660). This design uses deformable mirrors or other spatial light modulators (see Pape D. R. and Hornbeck L. J., Characteristics of the Deformable Mirror Device for Optical Information Processing, Opt. Eng. Vol. 22, No. 6, Dec. 1983, pp. 675–681). Machines using acousto-optics for matrix algebra operations are in research. These computers, although significant for numerical computation, have limited algorithm felxibility because of the interconnection systems used. They are also not aimed at signal processing applications.

Small commercial crossbar switches made entirely of semiconductor devices have recently become available; see the description of the AS8840 chip from Texas Instruments on pages 72–73 of Electronics for Feb. 5, 1987. The AS8840 is a 16-port crossbar integrated circuit which is dynamically reconfigurable; each of the ports handles a nibble (four bits) bidirectionally.

D. Grant et al, An Optical Phased Array Beam Steering Technique, 1971 Proceedings of the Electro Optic System Design Conference pages 259–264, describes reflection of collimated light from a membrane spatial light modulator is passed through a sampling mask and the phase variations caused by the pixels of the spatial light modulator combine to form a single spot on a receiver array. Varying the pixel deformations controls the phase variations and thereby steers the spot across the receiver array.

However, the known optical interconnection networks for high speed data transmission are limited in size by inefficiencies in handling the optic power.

SUMMARY OF THE INVENTION

The present invention provides optical interconnection networks that use deformable mirror devices with on-axis optics including diameter-limited imaging lenses and optical fiber bundles for high efficiency with high speed detectors. Preferred embodiments use a tightly packed staggered bundle of single mode optical fibers for input to insure image magnification to the deformable mirror device and consequent decrease of ligh bundle numerical aperture. The small light bundle numerical aperture allows large deformable mirror devices to be imaged on small high speed detectors.

BRIEF DESCRIPTION OF THE DRAWINGS

The drawings are schematic for clarity.

DESCRIPTION OF THE PREFERRED EMBODIMENTS

A preliminary description of reconfigurable optical interconnection networks will be followed by descriptions of the preferred embodiments. Generally, an interconnection network permits N inputs to be connected to K outputs with each output equal to one of the inputs.

Figure 1A:
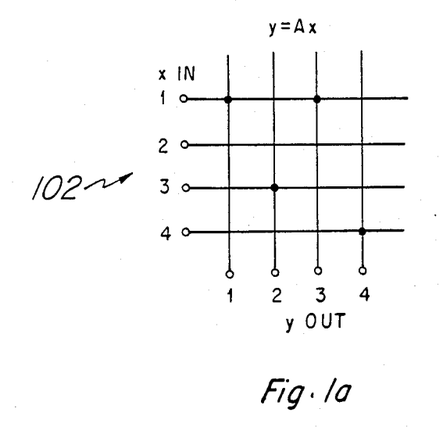
FIGS. 1A–B illustrate an optical crossbar switch.
Figure 1B:
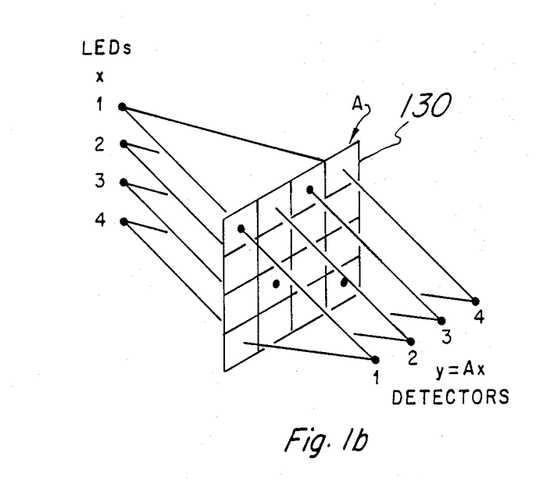

FIG. 1A schematically illustrates a 4 by 4 crossbar switch 102. Each intersection has a directional switch permitting a horizontal input line to be coupled with a vertical output one. Black circles indicate closed switches. One ouput receives information from one input, but one input may broadcast to several outputs. FIG. 1B shows a diagrammatic crossbar switch 102 implemented with spatial light modulator 130 and dots indicate transparent regions consistent with the settings of FIG. 1A. An optical lens system (not illustrated) is used to spread the light from the input sources (LEDs 1-4) horizontally without spreading the light vertically. Light passing through spatial light modulator 130 is collapsed onto receiving diodes (Detectors 1-4) by means of a lens system (not illustrated) which focusses vertically without spreading horizontally. Information is transmitted through switch 102 by encoding the information as modulation of the transmitter light beams and received by demodulating the received signals.

Figure 2:
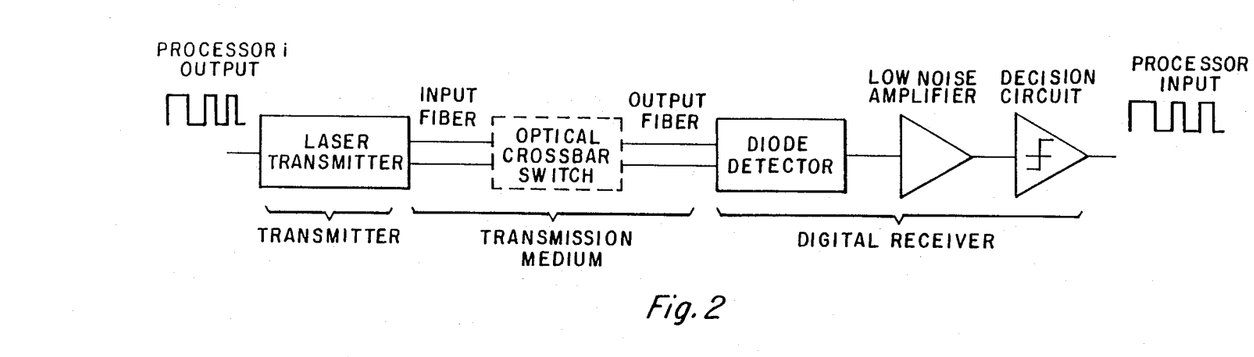
FIG. 2 illustrate a crossbar switch in a communication link.

FIG. 2 shows an optical crossbar switch as a communication link consisting of transmitter, receiver, and the transmission medium. The transmission medium includes short lengths of optical fiber and openair optics. Compared to long distance links, where the large fiber attenuation increases the signal to noise ratio prior to the detector, losses in a crossbar are due primarily to reflection, and noise contribution is due primarily to the receiver without consideration of transmitter laser noise.

Figure 3:
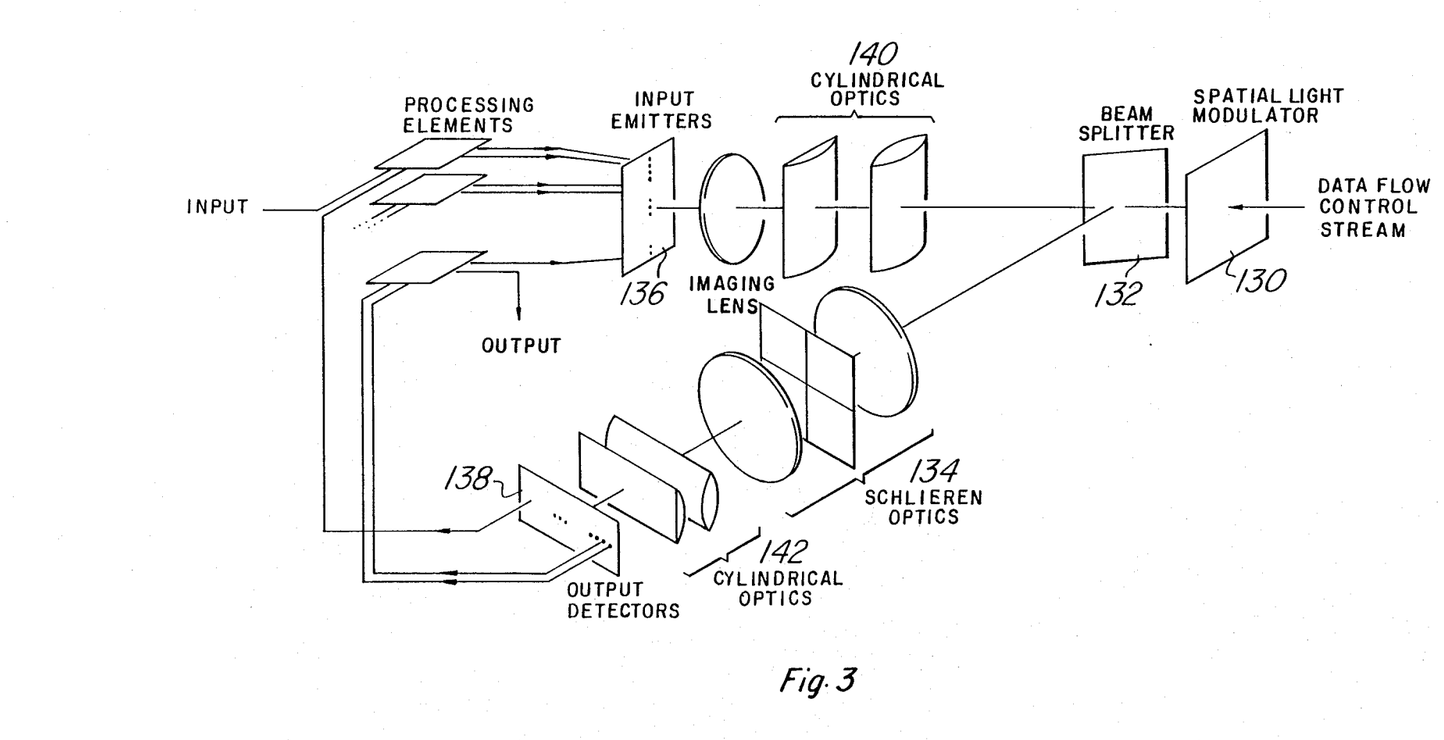
FIG. 3 shows the open-air portion of a crossbar switch.

FIG. 3 illustrates switch 102 as implemented by a deformable mirror device (DMD) as the spatial light modulator 130 together with connections to the switch for a plurality of processors. DMDs act as variable intensity reflectors rather than transparent modulators, consequently, the right side of the modulator is folded back. A beam splitter 132 is used to separate the returning light from the incident light. (Alternatively, tilting DMD 130 relative to the optic axis may avoid a beam splitter.) Schlieren optics 134 are used to block reflections from the regions between pixels and from undeflected pixels of DMD 130. Laser diodes 136, with modulation capability to 3 GHz will act as sources and p-i-n diodes 138 as detectors. The optics not illustrated in FIG. 1B are schematically shown in FIG. 3: cylindrical optics 140 spreads the light from the input sources 136 horizontally and cylindrical optics 142 collapses the light vertically onto the receiving diodes 138. Of course, the lenses illustrated are just functional representations of quite complex optics in practice. The light sources 136 and receivers 138 could be integrated directly on the electronic chips.

Deformable mirror devices of the membrane and cantilever type have been developed. The results for imaging and performing spectral analysis with a Texas Instruments membrane DMD have been published; see D. R. Pape, L. J. Hornbeck, Opt. Eng., 22(6), 675 (1983), and description of the Texas Insturments cantilever beam DMD appears in L. J. Hornbeck, U.S. Pat. No. 4,566,935. A cantilever beam DMD typically is an X-Y array of deformable mirror elements that can be addressed by an underlying array of MOS transistors; see FIG. 4A for a perspective view of a mirror elements and FIG. 4B for a schematic view of the array. A reflecting conductive metal layer 26 covers the surface of the array and has cutouts forming mirrors 28. The line-addressed organization of the DMD is shown in FIG. 4B; data are fed to a serial-to-parallel converter 171 that is connected to the drain lines 172 of the MOS transistors. Drain lines 172 are charged (the $k^{th}$ line 172 is charged to a potential $\phi_{k,m}$), and decoder 174, connected to gates 176, selects the $m^{th}$ gate to turn on. Floating sources 178 of the MOS transistors in the $m^{th}$ gate line 177 are then charged to the potential of the corresponding drain 172 (the $m^{th}$ charged to $\phi_{k,m}$). The gate is then turned off, and mirror 28 is held at a fixed potential of $V_M$; thus an electrostatic force proportional to $V_M - _{k,m}$ acts on the $(k,m)^{th}$ mirror element and causes it to deflect down towards the floating source 178. The mechanical response time of a mirror element and hence line settling time is a few $\mu$sec. Once the floating sources 178 in the $m^{th}$ gate line 177 have been set, then the next line of data is fed into drain lines 172, and the next gate line 177, selected by decoder 174. The deflection of the membrane or beam is a nonlinear function of the applied voltage and approximates the form illustrated in FIG. 4C; note that above a critical "collapse voltage" the membrane or beam is unstable against collapse to the charged capacitor plate. Of course, there is a range of voltages in which the cantilever beam deflection may be reliably controlled. The size of the mirror elements for both the membrane and cantilever beam devices is in the order of 25 microns square.

Figure 5A:
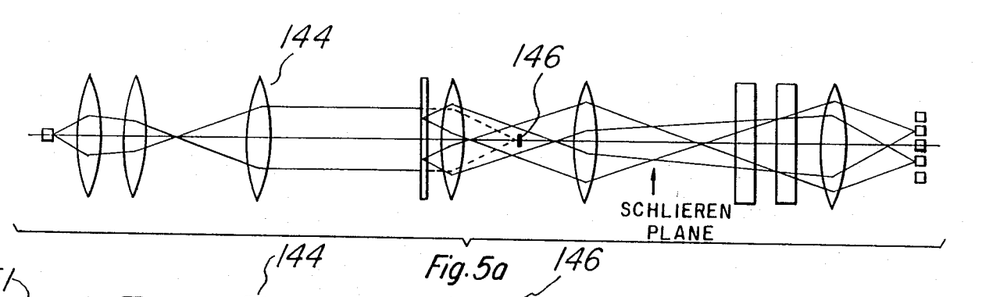
FIG. 5 shows ray tracings in a crossbar switch.
Figure 5B:
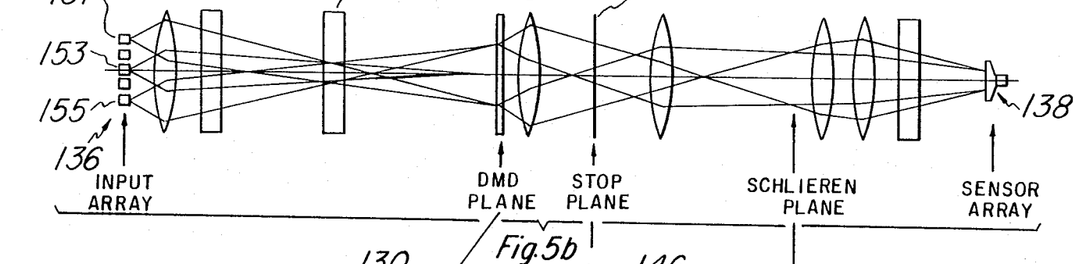
Figure 5C:
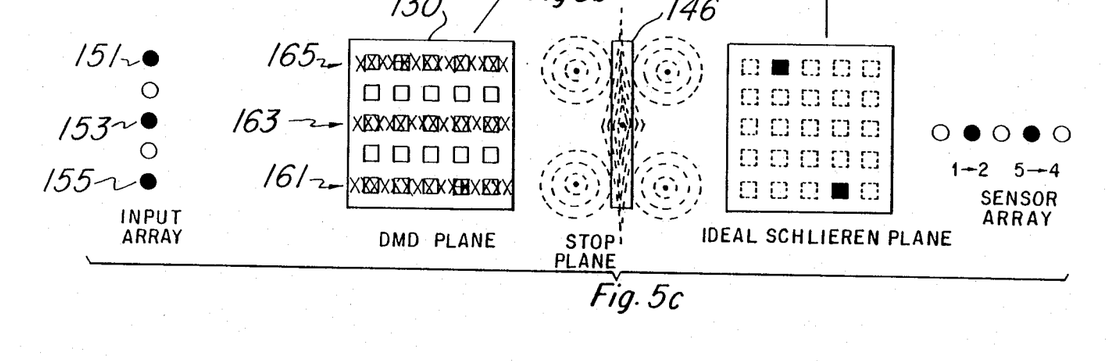

FIG. 5 is a detailed layout for the optical crossbar switch shown in FIG. 3 with some rays traced to illustrate the optics. FIG. 5 shows the crossbar switch from three views; note that the system lacks rotational symmetry and that some lenses (cylindrical lenses) only focus in one view. Also note that for clarity the DMD is shown as being a transmissive rather than a reflective five-by-five device. The five inputs are five intensity modulated laser diodes, and the lasers' light 136 which typically may be 100 $\mu$m diameter fibers spaced about 100 $\mu$m apart. The fibers can be closely packed over a short propagation length, while the laser diodes can be separated for electromagnetic isolation. In the top view of FIG. 5 the light from the fibers is diverged to the width of a row of pixels in DMD 130. Lens 144 collimates the light to the plane of DMD 130. FIG. 5 illustrates fibers 151, 153, and 155 emitting light which illuminates pixel rows 161, 163, and 165 of DMD 130; DMD 130 is configured with only one pixel in row 161 and one pixel in row 165 deflected.

The collimated light reflects off of DMD 130 with the light reflecting from undeflected pixels and the area between the pixels having low spatial periodicity and thus being highly attenuated by the Schlieren stop 146 (this is illustrated by the dotted lines in the top view of FIG. 5). Contrarily, the light reflecting from deflected pixels will be phase modulated at a high spatial frequency and pass around Schlieren stop 146 with only mild attentuation as illustrated by the dotted line circles in the cross view of FIG. 5. The light passing Schlieren stop 146 is reimaged onto horizontal array 138 of receiving optical fibers with the light from a column of pixels of DMD 130 imaged onto a single receiving fiber.

In FIG. 5 the second pixel of row 165 and the fourth pixel of row 161 are deflected and illuminated, so the second and fourth receiving fibers are illuminated. Ideally, only the light from the deflected pixel in one DMD row is imaged onto the appropriate output receiving fiber; however, a portion of light from the other undeflected rows (transmitted from the other input array fibers) will diffract around the vertical Schlieren stop and be focussed onto the same receiving fiber as the deflected light signal of interest. Thus care must be taken in design of both horizontal and vertical stop dimensions to maximize deflected to undeflected energy reaching receiving array 138.

Figure 6:
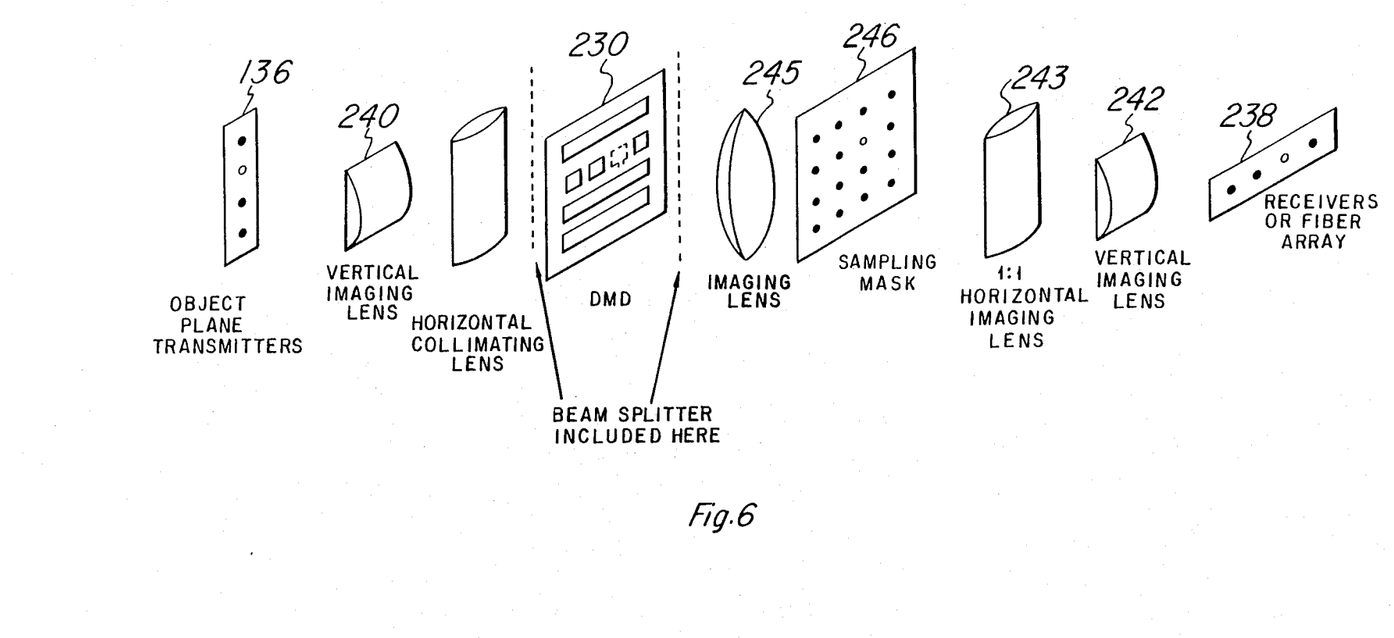
FIG. 6 shows the open-air portion of a first preferred embodiment.

First preferred embodiment optical interconnection network, schematically illustrated in FIG. 6 with a four by four DMD, is similar to the network illustrated in FIGS. 3 and 5 but uses undeflected pixels in DMD 230 to correspond to interconnections rather than deflected pixels as in DMD 130. As before, the lenses are just functional representations. FIG. 6 illustrates the interconnection of the second transmitter row to the third receiver column by deflecting all pixels except the one in the second row and third column of DMD 230 (the image inversions caused by the lenses have been omitted for clarity). The image reflected off of DMD 230 is reimaged by lens 245 onto sampling mask 246 which is used to block out light reflected from the areas of DMD 230 between the pixels. Deflected pixels reflect incoming light beyond imaging lens 242 as described below. This use of lens 242 rather than Schlieren stop 146 has the advantage of utilizing the on-axis light for the interconnections, rather than the light reflected off deflected pixels, and this implies the use of smaller diameter lenses and less time dispersion in the received signal.

Several sources of loss, such as glass attenuation, metal reflectivity, beam splitter loss, inactive area of DMD 230, fanout of transmitter light across an N pixel row, nonuniform illumination of rows of DMD 230, illumination of finite aperture lenses, and imperfect contrast between on and off states, occur in the first preferred embodiment; and estimation of the latter three of these losses will help further describe features of the first preferred embodiment. In particular, to obtain useful large interconnection networks the inputs will need to be of small size and low numerical aperture (NA) and tightly packed together to permit magnification by imaging lens 240, and the demagnification from DMD 230 to detectors 238 will need to avoid loss from lens 242 overfill.

Figure 9:
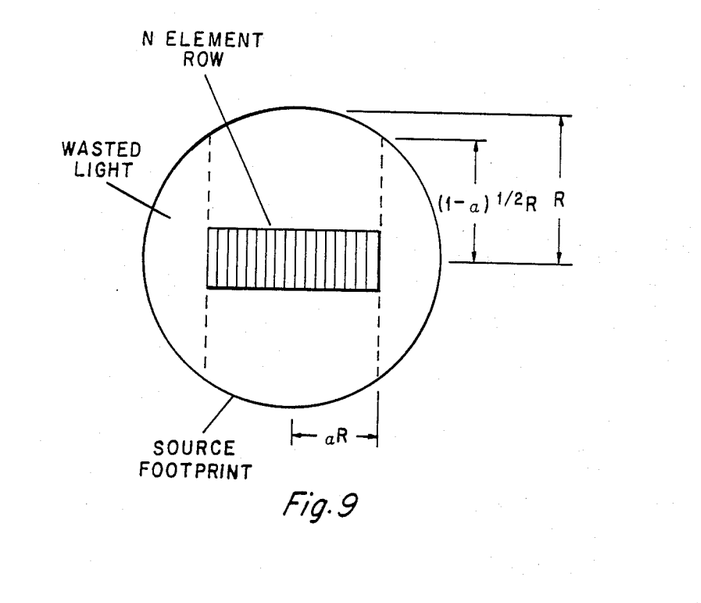
FIGS. 9–10 illustrate input light coverage in the first preferred embodiment.
Figure 10:
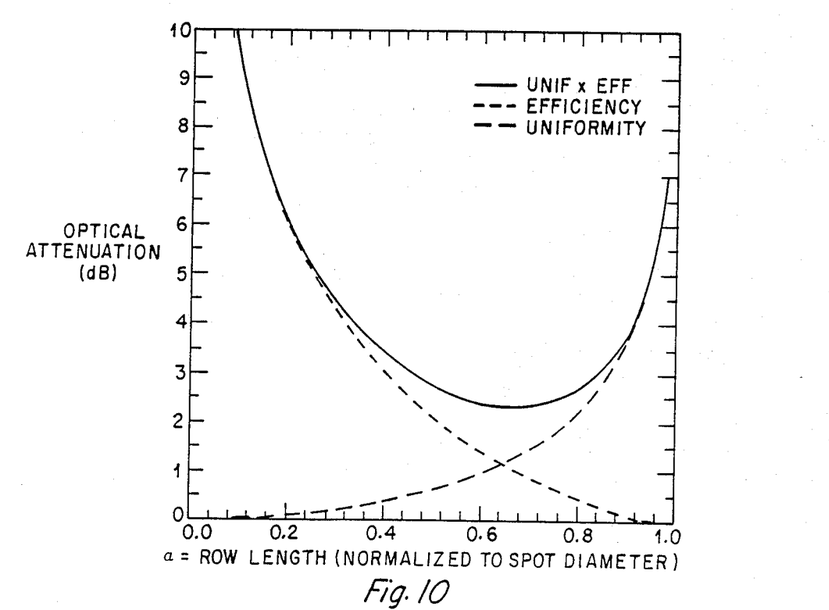

The row illumination of a DMD 230 row is derived from a circular beam that is compressed vertically by anamorphic lens 240; see FIG. 9 which illustrates the geometry. The light energy density at the end pixels of a row will typically be smaller than at the central pixel, and thus the best energy utilization is for maximization of the light available to the least illuminated pixel. This can be approximated in closed form by presuming uniform light intensity out to a radius of R emitted from a point source (optical fiber 136) with small angular divergence. FIG. 9 shows the uniformity of row illumination to depend on $\alpha$ as $\sqrt{1-\alpha^2}$ and the efficiency (ratio of light intercepted by a row to total light emitted by a source) to depend on $\alpha$ as $$\frac{2}{\pi}(\alpha\sqrt{1-\alpha^2} + \arcsin\alpha)$$

and the product of uniformity times efficiency is illustrated in FIG. 10.

Figure 4A:
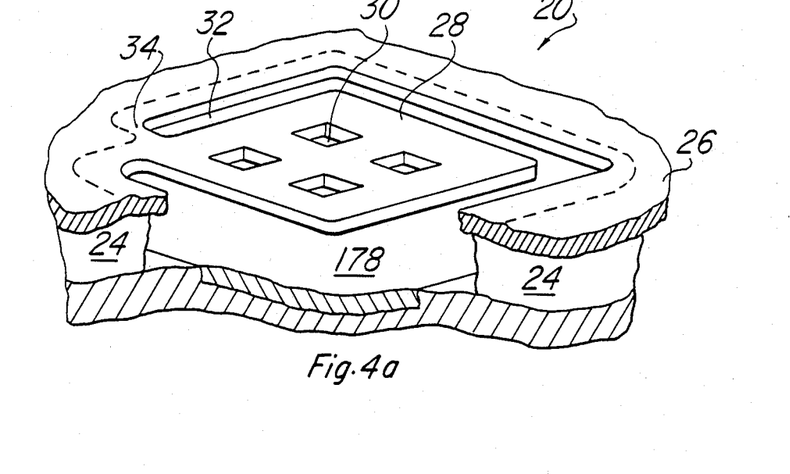
FIGS. 4A–C illustrate a cantilever beam deformable mirror device.
Figure 4B:
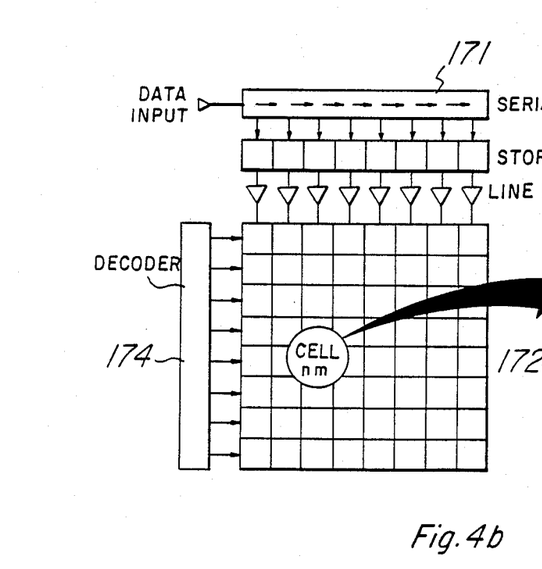
Figure 4C:
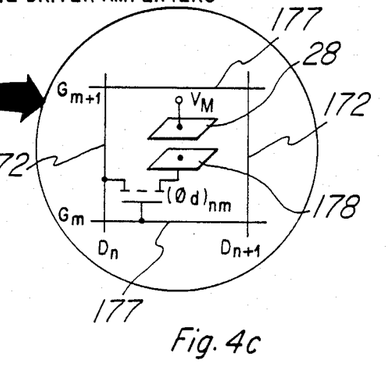
Figure 4D:
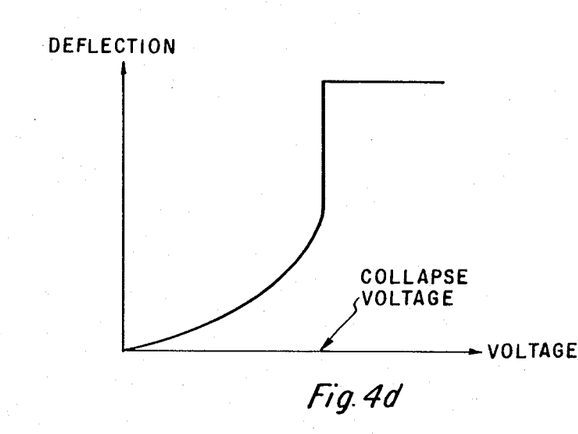
Figure 7A:
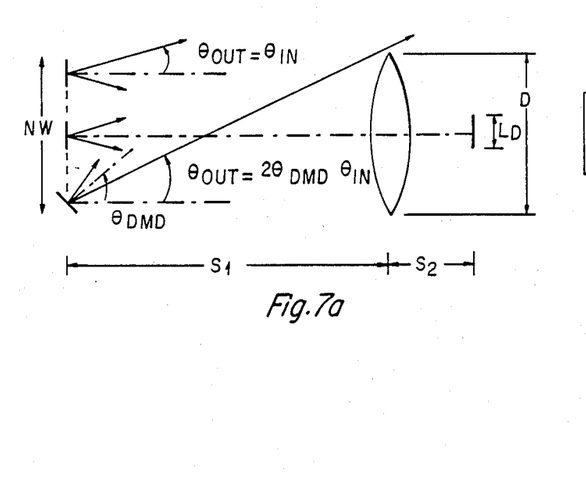
FIGS. 7A–B illustrate light rays in a portion of the first preferred embodiment.
Figure 7B:
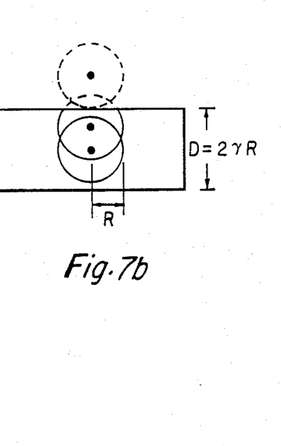
Figure 8:
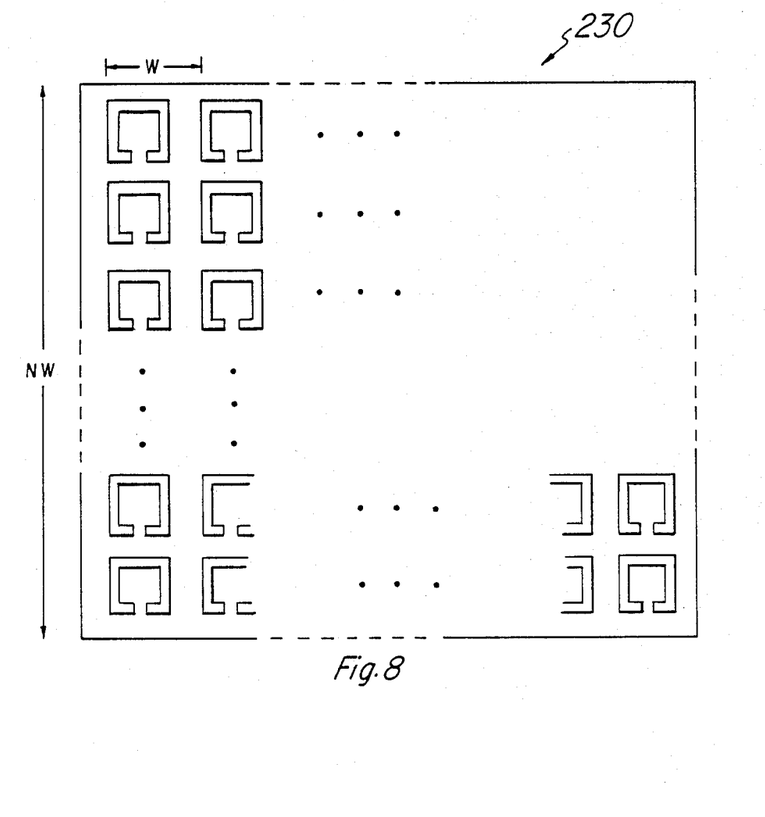
FIG. 8 illustrates the DMD for the first preferred embodiment.

FIG. 7 is a simplified model of the optics system from DMD 230 to detectors 238; the sampling mask optics and horizontal imaging lens have only minor effects on contrast and vertical lens aperture collection efficiency. DMD 230 will be presumed to have N rows and columns for clarity. Each column of pixels of DMD 230 is imaged onto one detector 238 of width $L_D$ with magnification $$M = \frac{S_2}{S_1} = \frac{L_d}{Nw}$$

where $S_1$ is the distance from DMD 230 to imaging lens 242, $S_2$ is the distance from imaging lens 242 to detector 238, N is the number of rows and also the number of columns of pixels in DMD 230, and w is the periodicity of the pixels; see FIG. 8 which shows a plan view of DMD 230 and note that the cantilever beams are hinged to deflect parallel to the columns and not diagonally as indicated by FIG. 4A. High speed, high sensitivity detectors have typical diameters of 70 μm due to dark current and capacitance limitations; thus $L_D$ should be about 70 μm. In view of the typical value of w of 50 μm (25 μm cantilever beam plus 25 μm spacing) and N of 1,000, M is small and significant demagnification is required. Note that DMD pixels must be large enough to avoid diffraction loss as well as permit magnification at input, so the demagnification M cannot be avoided by just using small pixels. For this arrangement, light collection efficiency is influenced by the light bundle spread, $\theta_{IN}$, off individual pixels of DMD 230, the vertical diameter, D, of lens 242, and the height, Nw, of DMD 230. FIG. 7 shows both that the minimum light power from indeflected pixels is collected from the top row pixels, and that for complete removal of light from deflected pixels to avoid crosstalk requires the cantilever beam deflection angle, $\theta_{DMD}$, satisfy $$\frac{D + Nw}{2S_1} \leq 2\theta_{DMD} - \theta_{IN}$$

in order to remove all the light from a deflected pixel in the bottom row. Applying this analysis to the DMD geometry with the Schlieren filter shows that a larger lens or a decentered lens or lenses is required, but this limits the size of the DMD for a given performance and large lenses are difficult to fit into a small space. Note that the cantilever beam deflection angle is fixed; that is, a set voltage is applied to a pixel to deflect it, and the possibility of angle dependence upon applied voltage is not used. Furthermore, the inequality can be written in terms of a fundamental set of design variables $\gamma$ and C to be defined infra.

First, for lens 242 the focal length, f, is related to the distances $S_1$ and $S_2$ by the thin lens formula:

$$\frac{1}{f} = \frac{1}{S_1} + \frac{1}{S_2},$$

and recalling that M is small shows that $S_1$ approximately equals f times M. Next, the aperture of lens 242 relative to its focal length is defined by $$NA_{lens} = \frac{D}{2f},$$

The parameter $\gamma$ defined by lens 242 vertical diameter to spot diameter at the lens 242 can be shown to be $$\gamma = M \frac{NA_{lens}}{NA_{IN}}$$

where $NA_{IN}$ is approximately $\theta_{IN}$ because $\theta_{IN}$ will be shown to be small, that is, $NA_{IN}$ approximately equals $\sin(\theta_{IN})$.

The parameter C defined as DMD height to lens diameter, $$C = \frac{Nw}{D},$$

then the inequality can be written as $$\gamma\left(\frac{1-C}{2}\right) \leq \frac{\theta_{DMD}}{NA_{IN}} - \frac{1}{2}$$

For a DMD with pixels above the center line of the DMD deflecting upwards and pixels below the center line deflecting downwards the inequality becomes $$\frac{\gamma}{2} \leq \frac{\theta_{DMD}}{NA_{IN}} - \frac{1}{2}.$$

and is more easily satisified. For either form of the inequaltiy, $NA_{IN}$ is limited to be reasonably small by the limited deflection range of the pixels, which is approximately 0.12 radians. (Extreme deflection is also undesirable because it reduces cross sectional intersection with light and thus increases the stray light from diffraction.) For $\gamma$ equal to zero, $NA_{IN}$ could be no larger than 0.24, and $\gamma$ cannot be negative. With $NA_{IN}$ limited to about 0.24, and noting that the light bundle spread changes by the reciprocal of the magnification from input array 136 to DMD 230, the input optical fibers must be small diameter, low divergence sources. Using multimode fiber as a source would be unacceptable with the typical DMD cantilever beam dimensions of about 25 μm; for example, a standard 0.2 NA, 50 μm core fiber spaced at 100 μm for imaging onto consecutive DMD rows. A magnification of 0.5 is thus required and leads to an $NA_{IN}$ of 0.4, which is too large. Single mode optical fiber with NA equal to 0.1 and less than 10 μm core diameter for typical laser diode sources (wavelengths in the range of 0.84–1.55 μm) and a 20 μm core-to-core spacing and a 2.5 demagnification will map the light bundle NA to 0.04 at DMD 230. For a wavelength of 1 μm, the incident bundle gives a 99% energy encirclement diameter of 24 μm. Thus there is minimal diffraction in reflecting off of the cantilever beam and $NA_{IN}$ would equal the NA of the incident light bundle. This diffraction limited condition also points to optimum design of the DMD geometry and the lens aberration specification for lenses between the input fibers and the DMD. That is, to minimize diffracted and overlap loss from the DMD, we want to just fill a DMD row height which implies the required lens imaging properties.

Figure 11:
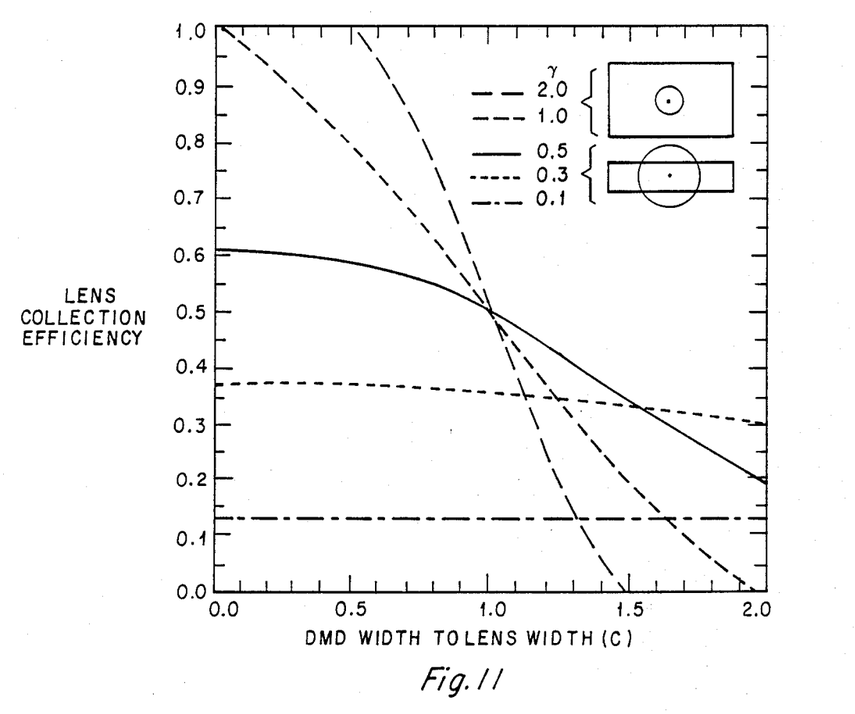
FIGS. 11–13 show parameter dependence in the first preferred embodiment.
Figure 12:
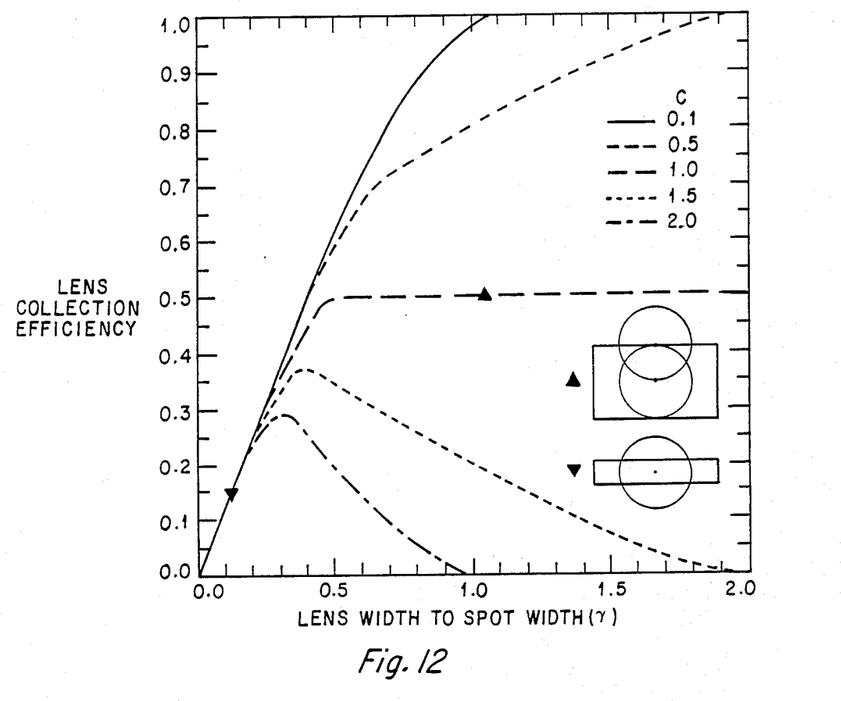
Figure 13:
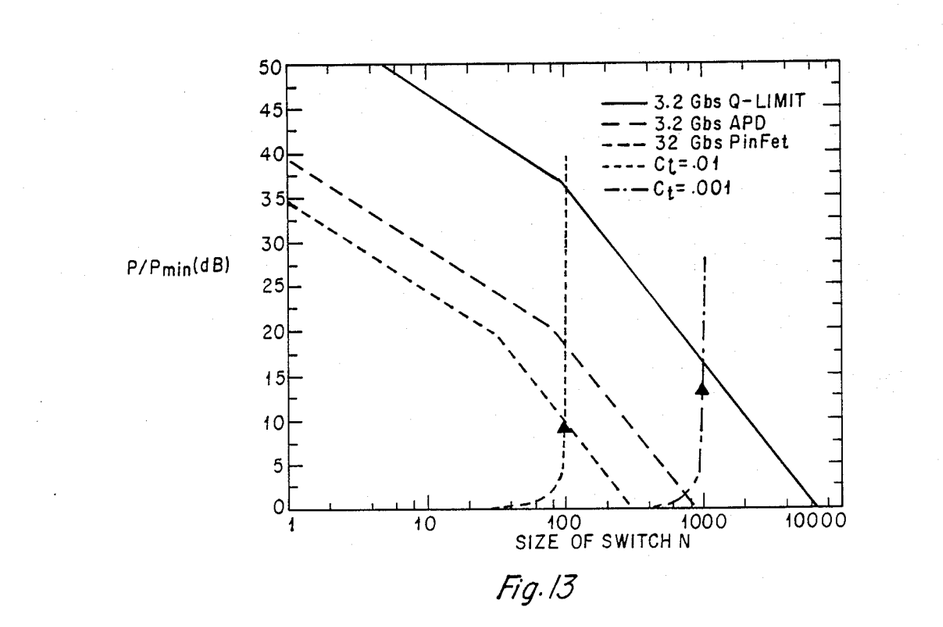

The geometric terms $\gamma$ and C also are design parameters that describe the ability of lens 242 to collect light. Previously $NA_{IN}$ was limited to avoid crosstalk; FIG. 7 also shows that small $NA_{IN}$ helps collection efficiency from undeflected pixels provided that the vertical diameter D of lens 242 is greater than the height Nw of DMD 230. The collection efficiency of lens 242 can be defined by the intensity ratio of light from the top undeflected pixel intercepted by lens 242 to the total light reflected from the pixel. The 1:1 horizontal imaging lens 242, and all light intercepted by lens 242 is presumed collected by detectors 238. Computing the lens 242 collection efficiency is routine in view of the derivation in connection with FIG. 9 and yields the results in FIGS. 11 and 12. For large $\gamma$ the central spot underfills lens 242; and a DMD 230 width increases, the extreme spot moves outside the lens aperture. Because the spot diameter is small compared to lens 242 aperture, the curve varies rapidly from unity to zero efficiency. For small $\gamma$ the central spot overfills lens 242 and accounts for most of the loss. Efficiency becomes nearly independent of C over this range because the extreme spot has an almost rectangular overlap of nearly the same dimensions as the central spot. In the small $\gamma$ region, efficiency can also be seen to be independent of C, as well as asymptotically linear in FIG. 12. In this region the efficiency is approximately equal to $$\frac{4}{\pi}\gamma,$$

which is inversely proportional to N by the previous equations. For energy efficient design, this approximation defines the region in which the lens is overfilled. The largest possible crossbars will probably overfill the lens because practical lenses are limited in numerical aperture and thus are described by this approxmiation. This result will significantly simplify predictions for maximium size DMD for an N by N crossbar. Rewriting $$\frac{4}{\pi}\gamma \text{ as } \frac{N_o}{N}$$

and combining this with the efficiency result expressed in FIG. 10 and other standard system estimates, an energy budget may be generated as in FIG. 13. Before interpreting FIG. 13, its derivation will be given.

Note that receiver array 238 could be either an open air detector array (probably monolithic) or an optical fiber bundle, the fibers of which are connected to discrete detectors located a short distance away from array 238. Detector arrays offer the advantages of large acceptance angle and compact integration compared to discrete detectors, but sensitivity and immunity to electical crosstalk are problems. Consequently, both optical fiber bundle and detector array versions of receiver array 238 are possible. And with the great demagnification by lens 242 the maximum effective $NA_{lens}$ is limited to the acceptance angle, $NA_{fib}$, of the optical fiber; thus multimode fiber would be used.

Table I contains estimates for the significant terms for computing the loss in traversing a node of the crossbar switch and thus an energy budget. Transverse single mode lasers can ideally be lens coupled to single mode fibers with no loss if perfect alignment is maintined. Also in practical designs, losses result from the overfilling of pixels and consequent diffractive spreading unless DMD pixels are of adequate size.

| Variable | Range |
|---|---|
| DMD size (N) | 1–10,000 |
| Transmitter power ($P_{in}$) | 30 m W |
| Detector sensitivity for $10^{-9}$ bit error rate | $2.2 \times 10^{-6}$ to $1.8 \times 10^{-4}$ m W |
| AR coated glass efficiency | 0.85 |
| Beam splitter efficiency | 0.25 |
| Fiber and splice efficiency | 0.65 |
| Pixel reflectivity | 0.90 |
| Undeformable surface | 0.5 |
| Spread across DMD row | $\frac{1}{N}$ |
| Spread wider than DMD row | 0.55 |
| Demagnification to detector | $\frac{N_o}{N}$ |
| Fiber to detector coupling | 0.49 to 1 |
| Transmitter to fiber | 1 |
| Vertical overfill pixel | 1 |

The individual terms may be combined to yield the overall power available at the detector:

$$P_{avail} = \frac{0.034}{N} \frac{N_o}{N} \left(\frac{L_d}{D_f}\right)^2 P_{in}.$$

$P_{avail}$ must be no smaller than $P_{min}$, the minimum detectible power for a specified bit error rate. Note that the receiver sensitivity range is representative of 320 Mbs PINFET (dashed line in FIG. 13), 3.2 Gbs avalanche photodiode (broken line in FIG. 13), and 3.2 Gbs quantum limit (solid line in FIG. 13). The curves in FIG. 13 result from inserting the parameters for the three receiver types into the power available expression. The two vertical curves in FIG. 13 are included to illustrate the effect of crosstalk on DMD size. These curves represent sensitivity derating due to equal contribution of light at a level of $C_t$ below the "on" pixel intensity, from $N-1$ "off" pixels. Thus the DMD size N is limited to the size indicated by the intersection of the energy budget curve corresponding to the detector type and the derating curve; and there is a natural boundary at $N_{max} = 1/C_t$ if the pixel-induced crosstalk is substantially larger than $P_{min}$.

In summary, the results for asymptotic efficiency embodies design constraints and rationale as asymptotic efficiency equals $$\frac{4}{\pi} \frac{L_D}{N_w} \frac{NA_{lens}}{NA_{IN}}$$

First make $L_D$ as large as possible, but it is limited by speed considerations; secondly, Nw is desirably as large as possible for more interconnectivity, but this reduces efficiency and w is limited by diffraction; make $NA_{lens}$ as large as possible, but practical limitations exist such as the requirement of high refractivity materials and aberrration, and make $NA_{IN}$ as small as possible but this is limited by source input and DMD size constraints.

Figure 14:
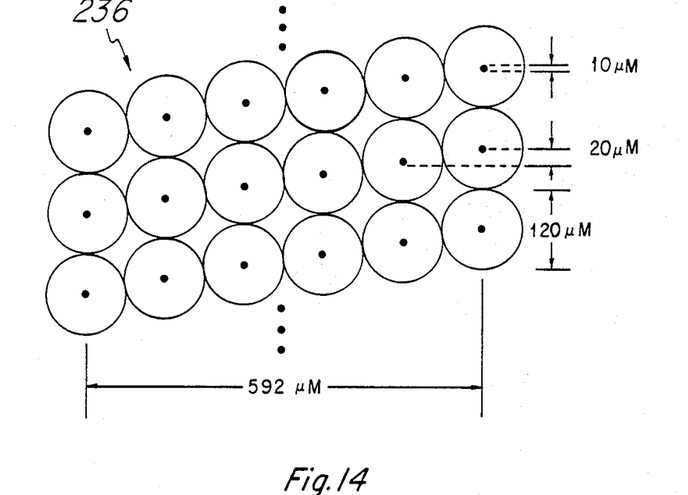
FIG. 14 is a cross sectional view of the second preferred embodiment input optical fiber bundle.

Second preferred embodiment optical interconnection network is similar to the first preferred embodiment but uses input array 236 illustrated in cross view in FIG. 14 in place of input array 136. Optical fiber bundle 236 uses optical fibers with 10 μm diameter cores and cladded to a total diameter 120 μm; thus the vertical spacing between core centers is 20 μm. The 120 μm total diameter and the 20 μm center-to-center prescribe the six-fiber width of bundle 236; the horizontal spread of 592 μm will cause only small variation in thge uniformity of illumination between rows of DMD 130 if the light is allowed to spread somewhat wider than the bundle width. Of course, the network illustrated in FIG. 6 only has four input fibers shown for clarity; the general situation as illustrated in FIG. 3 may have 1,000 input fibers. For 1,000 input fibers, bundle 236 would have 167 staggered rows of six fibers per row. And the broad valley of the curve in FIG. 10 indicates that the illumination variation due to the staggering of bundle 236 can be made small for a small bundle width. For the approximately 600 μm bundle width of bundle 236 and the 50 μm spaced cantilever beams of 25 μm size, FIG. 10 shows that a 2.5 dB overall loss would be possible for as few as 40 pixel rows.

Variations of the bundle of FIG. 14 include the following: if the fiber core has diameter d and the cladded total diameter is D, then a core center vertical spacing of D/n is achieved by staggered rows of n fibers and this core center spacing may be less than the core diameter d.

Figure 15:
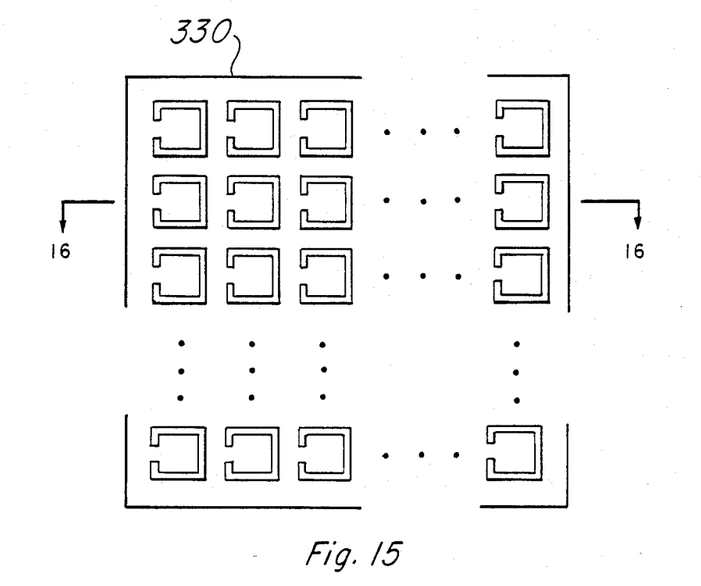
FIGS. 15-16 illustrate the DMD for the third preferred embodiment.
Figure 16:
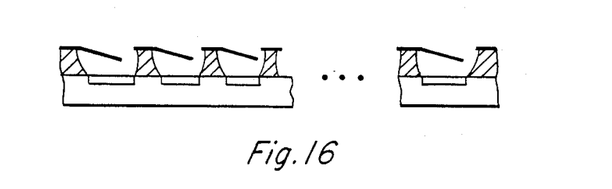

Third preferred embodiment interconnection network is similar to the first preferred embodiment but uses DMD 330 as a blazed grating; that is, all pixels in a row are deflected by the same angle and this angle is adjustable. See FIG. 15 for a plan view of DMD 330 illustrating the hinging of the cantilever beams so that all the pixels in a row may be deflected to form a one-pixel wide blazed grating as shown in the FIG. 16 which is a cross sectional elevation view along line 16—16 of FIG. 15. Thus each row of DMD 330 is used as a scanner; the diffraction pattern of collimated light off of a row gives a peak that has a resolution equal to the number of pixels in the row. The angle of deflection then determines the position of the spot in the diffraction plane and thus which receiver is illuminated. Lens 243 is a Fourier transform lens and not an imaging lens. This operation is analogous to an acousto-optic Bragg cell scanner/deflector. It would be extremely costly and bulky to built a scanner with as many channels as a typical DMD (128 to 1,000). Also, the DMD is simplified in that only one analog driver is required for each row of pixels because all pixels in a row have the same applied voltage and deflection. In contrast to the first preferred embodiment, the third preferred embodiment can scan the light from a single row to only one output receiver in array 238 at a time. Each of the N rows can be scanned to a particular output position, and the network would then be able to form any permutation of input channel with output channel. The coherent addition of light from the individual periodically spaced deflected pixels forms a much narrower peak intensity pattern. If the diffraction intensity pattern of a single deflected pixel is $sinc^2 x$, then the diffraction pattern of N deflected pixels will be approximately $N^2 sinc^2 Nx$. The central lobe of the reflected light beam is deflected specularly based on the blaze angle, the angle of incidence, and the wavelength. The angle of deflection in a pixel varies continuously with the applied voltage (FIG. 4C), and thus the blaze angle can be controlled to move the spot to the desired output receiver.

MODIFICATIONS AND ADVANTAGES

Various modifications of the preferred embodiment devices and methods may be made. For example, the DMD could have various types of deflectable beams such as torsion beams (hinged at two points and twisting along the hinges), the optics systems shown as simple ideal lenses could be multiple element systems with various folds in the optic axis, the laser diodes could be other types of light emitters, the DMD areas between pixels could be darkened in order to eliminate the sampling mask, and so forth.

The invention provides the advantages of large size networks by the efficient direction and low losses of the interconnecting light beams.

What is claimed is:

1. A reconfigurable optical interconnection network, comprising:
   (a) an array of N inputs, each of said inputs emitting a light beam
   (b) a deformable mirror device with N rows and K columns of pixels;
   (c) a first set of lenses directing each of said light beams onto one of said rows of pixels;
   (d) an array of K outputs;
   (e) a second set of lenses directing that portion of each of said light beams reflecting off of undeflected ones of said pixels in one of said columns onto one of said outputs, and directing that portion of each of said light beams reflecting off of deflected ones of said pixels away from said outputs; and
   (f) a controller determining the deflections of said pixels.

2. The network of claim 1, wherein:
   (a) said second set of lenses includes a sampling mask to block the portions of said light beams reflecting from non-pixel areas of said deformable mirror device.

3. The network of claim 1, wherein:
   (a) said array of inputs includes N intensity-modulated laser diodes with their outputs coupled to a bundle of optical fibers; and
   (b) said optical fibers are single mode.

4. The network of claim 1, wherein:
   (a) said second set of lenses includes an imaging lens of diameter in the direction of deflection of said light beams less than the effective distance from said deformable mirror device to said lens multiplied by the quantity $(2\theta_{DMD} - \theta_{IN})$ where $\theta_{DMD}$ is the angle of deflection of one of said deflected pixels and $\theta_{IN}$ is the angular spread of said light beams at said deformable mirror device.

5. A bundle of optical fibers, comprising:
   (a) a plurality of optical fibers, each of said fibers with a core of diameter d and cladding about said core to form a total diameter of D;
   (b) said fibers arranged as a stack of staggered rows of n fibers in each row, the stagger of each row such that the centers of the cores of adjacent fibers in a row are displaced by a distance D/n in the direction of the stack.

6. The bundle of claim 5, wherein:
   (a) d is approximately equal to $$\tfrac{1}{2}\tfrac{D}{n};$$

and
   (b) each of said fibers is single mode.

7. A reconfigurable optical interconnection network, comprising:
   (a) an array of N inputs, each of said inputs emitting a light beam;
   (b) a deformable mirror device with N rows and K columns of pixels;
   (c) a first set of lenses directing each of said light beams onto one of said rows of pixels;
   (d) an array of K outputs;
   (e) a controller determining the deflections of said pixels with all pixels in a row having the same deflection; and
   (f) a second set of lenses directing that portion of each of said light beams reflecting off of deflected ones of said pixels to said outputs, said outputs located in the diffraction plane of said second set.

8. The network of claim 7, wherein:
   (a) said second set of lenses includes a sampling mask to block the portions of said light beams reflecting from non-pixel areas of said deformable mirror device.

9. The network of claim 7, wherein:
   (a) said array of inputs includes N intensity-modulated laser diodes with their outputs coupled to a bundle of optical fibers; and
   (b) said optical fibers are single mode.

* * * * *